United States Patent
Kennedy

(10) Patent No.: US 9,181,804 B1
(45) Date of Patent: Nov. 10, 2015

(54) BALL BEARING TURBOCHARGER BALANCER

(71) Applicant: BorgWarner Inc., Auburn Hills, MI (US)

(72) Inventor: Donald Michael Kennedy, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/624,140

(22) Filed: Feb. 17, 2015

(51) Int. Cl.
| | |
|---|---|
| *G01M 1/16* | (2006.01) |
| *G01M 1/30* | (2006.01) |
| *F01D 5/02* | (2006.01) |
| *F04D 29/60* | (2006.01) |
| *B23P 19/04* | (2006.01) |

(52) U.S. Cl.
CPC ............... *F01D 5/027* (2013.01); *B23P 19/04* (2013.01); *F04D 29/601* (2013.01); *G01M 1/16* (2013.01); *G01M 1/30* (2013.01); *F05D 2230/80* (2013.01)

(58) Field of Classification Search
CPC ........... G01M 1/32; G01M 1/36; G01M 1/22; G01M 1/04; G01M 1/16; G01M 1/30; F04D 29/0563; F04D 19/059; F16C 33/60; F16C 33/6637; F16C 33/76; F16C 35/12; F16C 35/067; F01D 5/027
USPC ........... 73/460, 462, 468, 455, 473, 476, 477; 700/279
See application file for complete search history.

(56) References Cited

U.S. PATENT DOCUMENTS

| | | | | | |
|---|---|---|---|---|---|
| 4,302,813 | A | * | 11/1981 | Kurihara et al. | 702/56 |
| 4,694,689 | A | * | 9/1987 | Kawasaki | 73/114.77 |
| 4,864,859 | A | * | 9/1989 | Jensen | 73/473 |
| 5,214,585 | A | * | 5/1993 | Ehrich | 73/462 |
| 5,400,256 | A | * | 3/1995 | Beale et al. | 701/124 |
| 5,408,875 | A | * | 4/1995 | Matsushita et al. | 73/462 |
| 5,659,136 | A | * | 8/1997 | Koch et al. | 73/462 |
| 6,618,646 | B1 | * | 9/2003 | Dyer | 700/279 |
| 6,789,422 | B1 | * | 9/2004 | Ward, Jr. | 73/462 |
| 7,415,878 | B2 | | 8/2008 | Gutknecht | |
| 8,322,204 | B2 | * | 12/2012 | Maeda | 73/116.04 |
| 8,365,406 | B2 | | 2/2013 | Cornelio | |
| 2008/0060434 | A1 | * | 3/2008 | Kershaw | 73/455 |
| 2008/0289416 | A1 | * | 11/2008 | Thelen | 73/471 |
| 2010/0064801 | A1 | * | 3/2010 | Hylton | 73/468 |
| 2013/0174658 | A1 | * | 7/2013 | Kataoka et al. | 73/462 |
| 2013/0340521 | A1 | * | 12/2013 | Clark et al. | 73/462 |

* cited by examiner

*Primary Examiner* — Helen Kwok
(74) *Attorney, Agent, or Firm* — BrooksGroup

(57) ABSTRACT

A method of balancing a core assembly of a turbocharger. The core assembly may include a rotor assembly having a compressor wheel and a turbine wheel connected for common rotation by a shaft. A first bending critical speed of the rotor assembly may be determined. The core assembly may be mounted in a balancing machine. A drive source may be engaged with the core assembly to impart rotation. The rotor assembly may be rotated at an initial phase speed that is between approximately 5500 revolutions per minute and the first bending critical speed. A state of imbalance of the rotor assembly may be determined at the initial phase speed.

28 Claims, 1 Drawing Sheet

BALL BEARING TURBOCHARGER BALANCER

TECHNICAL FIELD

The field to which the disclosure generally relates includes turbochargers for use with internal combustion engines and in particular, includes turbocharger core assembly balancing.

BACKGROUND

A turbocharger for use with an internal combustion engine may typically include a compressor that may be driven by a turbine or other rotation imparting device. The turbine may have a wheel connected to a compressor wheel by a common shaft that is supported for rotation by bearings. The bearings may be disposed in a housing that may be situated between the turbine and the compressor, which together may form a core assembly.

A turbocharger's rotor assembly may rotate at speeds that approach hundreds of thousands of revolutions per minute. In addition, the turbine may be exposed to high temperature exhaust gases and the resulting heat may be transferred to other system components. Under these harsh, and increasingly demanding operating conditions, the lifespan of a turbocharger is expected to match that of the engine with which it operates. To accomplish that challenge, the design of a turbocharger and its components must be robust to survive as expected, while still being cost effective and competitive. As a result, a turbocharger is designed to exacting tolerances and standards, and in view of the involved rotational speeds, a turbocharger assembly must be precisely balanced.

SUMMARY OF ILLUSTRATIVE VARIATIONS

According to a number of variations, a method of balancing a core assembly of a turbocharger may be provided. The core assembly may include a rotor assembly having a compressor wheel and a turbine wheel connected for common rotation by a shaft. A first bending critical speed of the rotor assembly may be determined. The core assembly may be mounted in a balancing machine. A drive source may be engaged with the core assembly to impart rotation. The rotor assembly may be rotated at an initial phase speed that is between approximately 5500 revolutions per minute and the first bending critical speed. A state of imbalance of the rotor assembly may be determined at the initial phase speed.

A number of additional variations may involve a method of balancing a core assembly of a turbocharger. A rotor assembly may be assembled from a compressor wheel and a turbine wheel connected for common rotation by a shaft. A first bending critical speed of the rotor assembly may be determined. The first bending critical speed may correspond to a natural frequency of the rotor assembly. The core assembly may be mounted in a balancing machine. A drive source may be engaged with the core assembly to rotate the rotor assembly. The rotor assembly may be rotated at an initial phase speed that is between approximately 5500 revolutions per minute and the first bending critical speed. A state of imbalance of the rotor assembly may be sensed. A correction amount needed to provide balance to the rotor assembly may be calculated based on the state of imbalance of the rotor assembly. A mass of the rotor assembly may be modified based on the correction amount. The rotor assembly may be rotated at a secondary phase speed after adjusting the mass. The secondary phase speed may be equal to an operational speed of the core assembly.

Additional variations may involve a method of balancing a turbocharger that has a ball bearing system supporting a rotor assembly. The rotor assembly may be assembled from a compressor wheel, a turbine wheel, and a shaft. A first bending critical speed of the rotor assembly may be determined. The first bending critical speed may result in a resonant vibration response of the rotor assembly. The core assembly may be mounted in a balancing machine. A drive source may be engaged with the core assembly to rotate the rotor assembly. The rotor assembly may be rotated at an initial phase speed that may be at least approximately 5500 revolutions per minute and that may be less than the first bending critical speed. A state of imbalance of the rotor assembly may be sensed. A correction amount needed to provide balance to the rotor assembly may be calculated based on the state of imbalance of the rotor assembly. A mass of the rotor assembly may be modified based on the correction amount. The rotor assembly may be rotated to a secondary phase speed after adjusting the mass. The secondary phase speed may be equal to an operational speed of the core assembly.

Other illustrative variations within the scope of the invention will become apparent from the detailed description provided herein. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawing, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
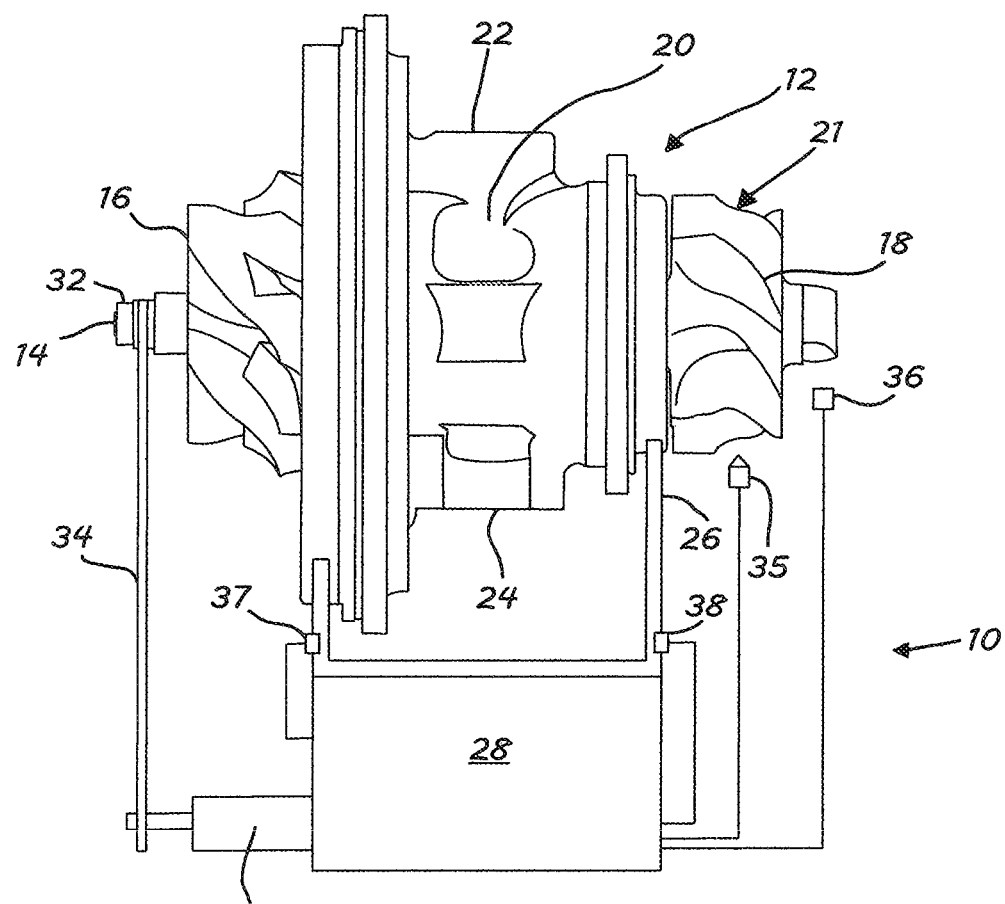
FIG. 1 is a schematic representation of part of a core assembly balancing apparatus according to a number of variations.

Referring to FIG. 1, an apparatus 10 for evaluating the balance of a turbocharger core assembly 12 according to a number of variations is illustrated. The core assembly 12 may include a rotor assembly 21 comprising a shaft 14 connecting a compressor wheel 16 and a turbine wheel 18. The rotor assembly 21 may rotate about a nominal axis that may be defined as the axis that exists along the shaft 14 when it is at rest. During operation, the actual rotation of the shaft 14 may deflect during rotation and so may not be precisely about the nominal axis. The deflection or bending of the shaft 14 and rotor assembly 21 may create resonant vibration effects at certain speeds, known as critical speeds. A mode that has a rotational speed of the shaft 14 that corresponds to the critical speed may occur at a natural frequency of the rotor assembly, resulting in a peak in a vibration response of the system and may be termed a critical bending mode. The critical bending mode speeds may be determined through known methods using computer analysis of the critical speeds for turbomachinery designs. For the shaft 14 and the rotor assembly 21, a number of rotational speeds may result in critical speed modes. The lowest rotational speed at which a critical bending mode is reached may be termed the first bending critical speed.

Figure 2:
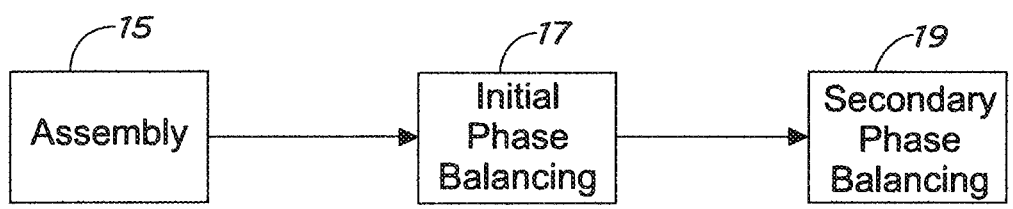
FIG. 2 is a diagrammatic representation of a core assembly and balancing method according to a number of variations.

The rotor assembly 21 including the turbine wheel 18, the shaft 14, and the compressor wheel 16 must be precisely balanced to perform at extremely high operational rotation speeds. As illustrated in FIG. 2, balancing may be a multistep process including assembly 15 of the core assembly 12, followed by an initial phase balancing step 17 and a separate secondary phase balancing step 19 to ensure a state of balance suitable for high speed operation is achieved. The initial phase may be used to reduce an initial state of imbalance. The initial phase balancing at step 17 is a prerequisite to accelerating the rotor assembly during the secondary phase balancing at step 19 to operating speeds that may be in excess of 200,000 revolutions per minute. To maximize the percentage of core assemblies for which the secondary phase vibration limit tolerances can be achieved, it has been found advantageous to operate the initial phase balancing at higher speeds. In particular, it has been determined that speeds above 5500 revolutions per minute are desirable. More particularly, speeds between 5500 revolutions per minute and the speed at which the first critical bending mode occurs are most desirable. The first critical bending mode may occur at speeds of 30,000 revolutions per minute, or more. Operating the first phase balancing at step 17 in the range above 5500 revolutions per minute, up to near the first critical bending mode speed may produce results that lead to higher yield success in the secondary phase balancing at step 19.

As shown in FIG. 1, the core assembly 12 may include a central housing 20 that supports the rotor assembly 21. The core assembly 12 is a subassembly of the turbocharger system that does not include the turbine and compressor end covers. The central housing 20 may support the shaft 14 through a lubricated ball bearing system, and may include a lubricant inlet 22 and outlet 24 to circulate lubricant to the rotation interfaces. The core assembly 12 may be mounted in a fixture 26 of a balancing machine 28. The balancing machine 28 may include a rotary drive unit that may be a motor 30, and which may be connected to a nose 32 of the compressor wheel 16, by a belt 34. The belt 34 may load the shaft 14 and the bearing cartridge in the housing 20, in addition to imparting rotation for the balancing phase. A compressed air drive 35 may be used in conjunction with the belt 34, wherein the belt 34 may load the shaft 14 and the air drive 35 may impart rotation to the rotor assembly 21.

Once the core assembly 12 is loaded in the fixture 26 and the belt 34 is attached, the initial phase of balancing may be initiated. The machine 28 may spin the shaft 14 at a speed above 5500 revolutions per minute, and below the first bending critical speed of the rotor assembly 21. Reaching or surpassing the first bending critical speed is not desired during the initial phase balancing. A speed sensor 36 may be used to monitor the rotational speed. The machine 28 may use sensors, such as load sensors 37, 38 located in the fixture 26 to measure dynamic imbalance of the system while the rotor assembly 21 is rotating, and may calculate correction amounts needed to provide balance. To do this, the machine 28 may be calibrated by placing weights of a known mass at a selected radius on the rotor assembly 21. The imbalance of the weighted rotor assembly 21 is measured and compared to a measured imbalance reading of the rotor assembly 21 without weights. The machine 38 is programmed to calculate mass and location angle determinants for correction of the rotor assembly's balance. The rotor assembly 21 may be modified with material, equivalent to the determined mass at the determined angle, being removed from the rotor assembly 21. A balance cut or a series of balance cuts may be made in either or both of the turbine wheel 18 and compressor wheel 16 to modify the rotor assembly 21 to achieve balance.

As illustrated in the process of FIG. 2, at step 15 the core assembly 12 is assembled from the shaft 14, the compressor wheel 16, the turbine wheel 18, and the central housing 20. The core assembly 12 may be complete with bearings, seals, thrust washers and other components internal to the central housing 20 to operably support the rotor assembly 21. Following assembly at step 15, the initial phase balancing may be carried out at step 17 at speeds between 5500 revolutions per minute and the first bending critical speed as described herein. Balancing may be repeated at operational speeds of the rotor assembly 21 for a secondary phase balancing at step 19. The secondary phase testing speeds are in the normal operational range of the core assembly 12. The normal operational speed may be in excess of 200,000 revolutions per minute. In the secondary phase, sensors may again be used to measure dynamic imbalance of the system while the rotor assembly 21 is rotating, and may then calculate correction amounts needed to provide balance. The machine used may be different than the machine 28 and may be programmed to calculate mass and location angle determinants for correction of the rotor assembly's balance. Material equivalent to the determined mass at the determined angle may then be removed from the rotor assembly 21 to provide balance. Give the high rotation speeds of the secondary phase of balancing at step 19, a belt drive may not be used but instead a drive such as the compressed air drive 35 may be used.

Through the foregoing structure and steps, a method of balance testing and correction for a turbocharger core assembly 12 is provided that may result in improved overall balancing results. The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered within the scope of the invention.

Variation 1 may involve a method of balancing a core assembly of a turbocharger. The core assembly may include a rotor assembly having a compressor wheel and a turbine wheel connected for common rotation by a shaft. A first bending critical speed of the rotor assembly may be determined. The core assembly may be mounted in a balancing machine. A drive source may be engaged with the core assembly to impart rotation. The rotor assembly may be rotated at an initial phase speed that is between approximately 5500 revolutions per minute and the first bending critical speed. A state of imbalance of the rotor assembly may be determined at the initial phase speed.

Variation 2 may include the method according to variation 1 and may include calculating a correction amount needed to provide balance to the rotor assembly based on the state of imbalance of the rotor assembly. The mass of the rotor assembly may be modified based on the correction amount.

Variation 3 may include the method according to variation 1 or 2 and may include rotating the rotor assembly to a secondary phase speed after adjusting the mass. The secondary phase speed may be equal to an operational speed of the core assembly.

Variation 4 may include the method according to any of variations 1 through 3 wherein the secondary phase speed may be in excess of 200,000 revolutions per minute.

Variation 5 may include the method according to any of variations 1 through 4 wherein the first bending critical speed may be at least approximately 30,000 revolutions per minute.

Variation 6 may include the method according to any of variations 1 through 5 wherein the initial phase speed may be near the first bending critical speed.

Variation 7 may include the method according to any of variations 1 through 6 and may include calibrating the machine by adding a weight to the rotor assembly and rotating the rotor assembly at the initial phase speed to determine a reference imbalance.

Variation 8 may include the method according to variation 7 and may include comparing the state of imbalance to the reference imbalance.

Variation 9 may include the method according to any of variations 1 through 8 wherein the core assembly may be configured to circulate a lubricant.

Variation 10 may include a method of balancing a core assembly of a turbocharger. A rotor assembly may be assembled from a compressor wheel and a turbine wheel connected for common rotation by a shaft. A first bending critical speed of the rotor assembly may be determined. The first bending critical speed may correspond to a natural frequency of the rotor assembly. The core assembly may be loaded in a balancing machine. A drive source may be engaged with the core assembly to rotate the rotor assembly. The rotor assembly may be rotated at an initial phase speed that is between approximately 5500 revolutions per minute and the first bending critical speed. A state of imbalance of the rotor assembly may be sensed. A correction amount needed to provide balance to the rotor assembly may be calculated based on the state of imbalance of the rotor assembly. A mass of the rotor assembly may be modified based on the correction amount. The rotor assembly may be rotated at a secondary phase speed after adjusting the mass. The secondary phase speed may be equal to an operational speed of the core assembly.

Variation 11 may include the method according to variation 10 wherein the secondary phase speed may be in excess of 200,000 revolutions per minute.

Variation 12 may include the method according to variation 10 or 11 wherein the first bending critical speed may be at least approximately 30,000 revolutions per minute.

Variation 13 may include the method according to any of variations 10 through 12 wherein the initial phase speed is near the first bending critical speed.

Variation 14 may include the method according to any of variations 10 through 13 and may include calibrating the machine by adding a weight to the rotor assembly and rotating the rotor assembly at the initial phase speed to determine a reference imbalance.

Variation 15 may include the method according to any of variations 10 through 14 and may include comparing the state of imbalance to the reference imbalance.

Variation 16 may include the method according to any of variations 10 through 15 wherein the core assembly may be configured to circulate a lubricant.

Variation 17 may include the method according to any of variations 10 through 16 and may include providing the drive source with a motor. The motor may be configured to be engaged with the compressor wheel through a belt.

Variation 18 may include the method according to any of variations 1 through 17 wherein the step of sensing a state of imbalance of the rotor assembly may involve sensing vibration of the rotor assembly.

Variation 19 may include the method according to any of variations 10 through 18 wherein the rotor assembly may be rotated by a compressed air drive.

Variation 20 may involve a method of balancing a turbocharger that has a ball bearing system supporting a rotor assembly. The rotor assembly may be assembled from a compressor wheel, a turbine wheel, and a shaft. A first bending critical speed of the rotor assembly may be determined. The first bending critical speed may result in a resonant vibration response of the rotor assembly. The core assembly may be mounted in a balancing machine. A drive source may be engaged with the core assembly to rotate the rotor assembly. The rotor assembly may be rotated at an initial phase speed that may be at least approximately 5500 revolutions per minute and that may be less than the first bending critical speed. A state of imbalance of the rotor assembly may be sensed. A correction amount needed to provide balance to the rotor assembly may be calculated based on the state of imbalance of the rotor assembly. A mass of the rotor assembly may be modified based on the correction amount. The rotor assembly may be rotated to a secondary phase speed after adjusting the mass. The secondary phase speed may be equal to an operational speed of the core assembly.

The above description of select variations within the scope of the invention is merely illustrative in nature and, thus, variations or variants thereof are not to be regarded as a departure from the spirit and scope of the invention.

What is claimed is:

1. A method of balancing a core assembly of a turbocharger, the core assembly including a rotor assembly having a compressor wheel and a turbine wheel connected for common rotation by a shaft, the method comprising:
   determining a first bending critical speed of the rotor assembly;
   mounting the core assembly in a balancing machine;
   engaging a drive source with the core assembly to rotate the rotor assembly;
   rotating the rotor assembly to an initial phase speed that is between approximately 5500 revolutions per minute and the first bending critical speed; and
   sensing a state of imbalance of the rotor assembly at the initial phase speed.

2. The method according to claim 1 further comprising:
   calculating a correction amount needed to provide balance to the rotor assembly based on the state of imbalance of the rotor assembly; and modifying a mass of the rotor assembly based on the correction amount.

3. The method according to claim 2 further comprising:
   rotating the rotor assembly to a secondary phase speed after modifying the mass, wherein the secondary phase speed is equal to an operational speed of the core assembly.

4. The method according to claim 3 wherein the secondary phase speed is in excess of 200,000 revolutions per minute.

5. The method according to claim 1 wherein the first bending critical speed is at least approximately 30,000 revolutions per minute.

6. The method according to claim 1 wherein the initial phase speed is near the first bending critical speed.

7. The method according to claim 1 further comprising:
   calibrating the machine by adding a weight to the rotor assembly and rotating the rotor assembly at the initial phase speed to determine a reference imbalance.

8. The method according to claim 7 further comprising:
   comparing the state of imbalance to the reference imbalance.

9. The method according to claim 1 wherein the core assembly is configured to circulate a lubricant.

10. A method of balancing a core assembly of a turbocharger comprising:

assembling a rotor assembly from a compressor wheel and a turbine wheel connected for common rotation by a shaft;
determining a first bending critical speed of the rotor assembly, wherein the first bending critical speed corresponds to a natural frequency of the rotor assembly;
loading the core assembly in a balancing machine;
engaging a drive source with the core assembly to rotate the rotor assembly;
rotating the rotor assembly to an initial phase speed that is between approximately 5500 revolutions per minute and the first bending critical speed;
sensing a state of imbalance of the rotor assembly;
calculating a correction amount needed to provide balance to the rotor assembly based on the state of imbalance of the rotor assembly;
modifying a mass of the rotor assembly based on the correction amount; and
rotating the rotor assembly at a secondary phase speed after modifying the mass, wherein the secondary phase speed is equal to an operational speed of the core assembly.

11. The method according to claim 10 wherein the secondary phase speed is in excess of 200,000 revolutions per minute.

12. The method according to claim 10 wherein the first bending critical speed is at least approximately 30,000 revolutions per minute.

13. The method according to claim 12 wherein the initial phase speed is near the first bending critical speed.

14. The method according to claim 10 further comprising:
calibrating the machine by adding a weight to the rotor assembly and rotating the rotor assembly at the initial phase speed to determine a reference imbalance.

15. The method according to claim 14 further comprising:
comparing the state of imbalance to the reference imbalance.

16. The method according to claim 10 wherein the core assembly is configured to circulate a lubricant.

17. The method according to claim 10 further comprising:
providing the drive source with a motor; and engaging the motor with the compressor wheel through a belt.

18. The method according to claim 10 wherein the sensing a state of imbalance of the rotor assembly, involves sensing vibration of the rotor assembly.

19. The method according to claim 17 wherein the balancing machine is configured with a compressed air drive and further comprising rotating the rotor assembly by the compressed air drive.

20. A method of balancing a turbocharger that has a ball bearing system supporting a rotor assembly, the method comprising:
assembling a compressor wheel, a turbine wheel, and a shaft to form the rotor assembly;
determining a first bending critical speed of the rotor assembly, wherein the first bending critical speed results in a resonant vibration response of the rotor assembly;
mounting a core assembly in a balancing machine;
engaging a drive source with the core assembly to rotate the rotor assembly;
rotating the rotor assembly at an initial phase speed that is at least 5500 revolutions per minute and that is less than the first bending critical speed;
sensing a state of imbalance of the rotor assembly;
calculating a correction amount needed to provide balance to the rotor assembly based on the state of imbalance of the rotor assembly;
modifying a mass of the rotor assembly based on the correction amount; and
rotating the rotor assembly to a secondary phase speed after modifying the mass, wherein the secondary phase speed is equal to an operational speed of the core assembly.

21. A method of balancing a core assembly of a turbocharger comprising:
assembling a rotor assembly from a compressor wheel and a turbine wheel connected for common rotation by a shaft;
determining a first bending critical speed of the rotor assembly, wherein the first bending critical speed corresponds to a lowest rotational speed for a natural frequency of the rotor assembly;
loading the core assembly in a balancing machine;
engaging a drive source with the core assembly to rotate the rotor assembly;
rotating the rotor assembly to an initial phase speed that is at least 5500 revolutions per minute and is less than the first bending critical speed;
sensing a state of imbalance of the rotor assembly;
calculating a correction amount needed to provide balance to the rotor assembly based on the state of imbalance of the rotor assembly;
stopping the rotor assembly;
changing a mass of the rotor assembly based on the correction amount; and
rotating the rotor assembly at a secondary phase speed after modifying the mass, wherein the secondary phase speed is equal to an operational speed of the core assembly and is faster than the first bending critical speed.

22. The method according to claim 21 wherein the initial phase speed is approximately equal to but less than the first bending critical speed.

23. The method according to claim 21 wherein changing the mass of the rotor assembly involves removing material from the rotor assembly.

24. The method according to claim 21 wherein changing the mass of the rotor assembly involves adding material to the rotor assembly.

25. The method according to claim 21 wherein changing the mass of the rotor assembly is done after rotating the rotor assembly to the initial phase speed and before rotating the rotor assembly to the secondary phase speed.

26. The method according to claim 21 wherein the secondary phase speed is a normal operating speed of the rotor assembly and the initial phase speed is lower than the secondary phase speed.

27. The method according to claim 21 wherein the secondary phase speed is over 200,000 revolutions per minute and the initial phase speed is between 5500 revolutions per minute and 30,000 revolutions per minute.

28. The method according to claim 21 further comprising calibrating the balancing machine by placing a known weight at a selected radius on the rotor assembly; measuring a first imbalance of the rotor assembly with the known weight; measuring a second imbalance of the rotor assembly without the known weight while rotating the rotor assembly at the initial phase speed that corresponds to the state of imbalance; and comparing the first imbalance to the second imbalance.

* * * * *